June 23, 1970 W. E. A. SCHMIDT 3,516,856
METHOD OF SEALING THE ENDS OF ELECTRICAL COMPONENTS
Filed June 15, 1967 4 Sheets-Sheet 1
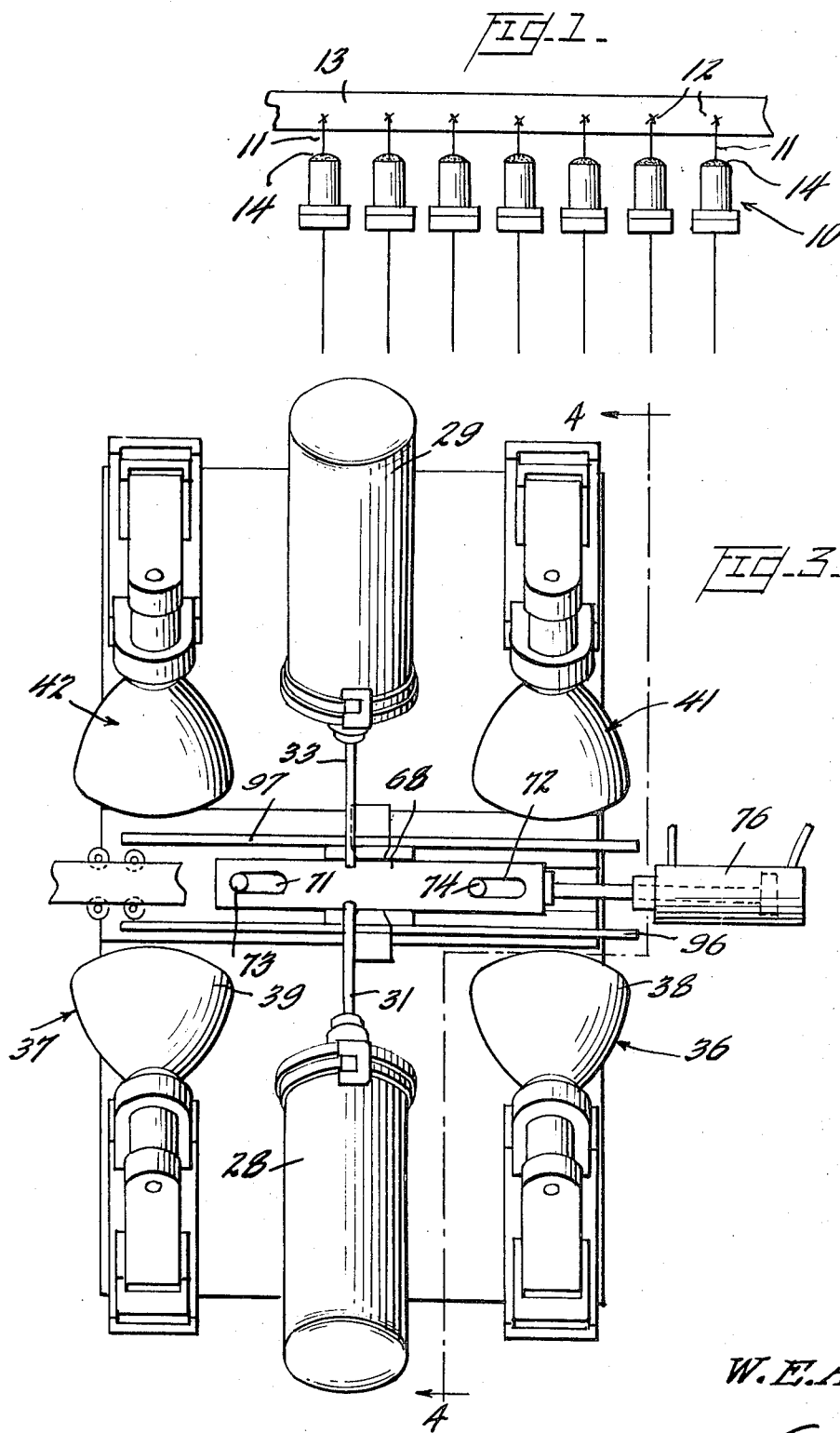
INVENTOR
W.E.A. Schmidt,
BY
S.A. Becker
ATTORNEY

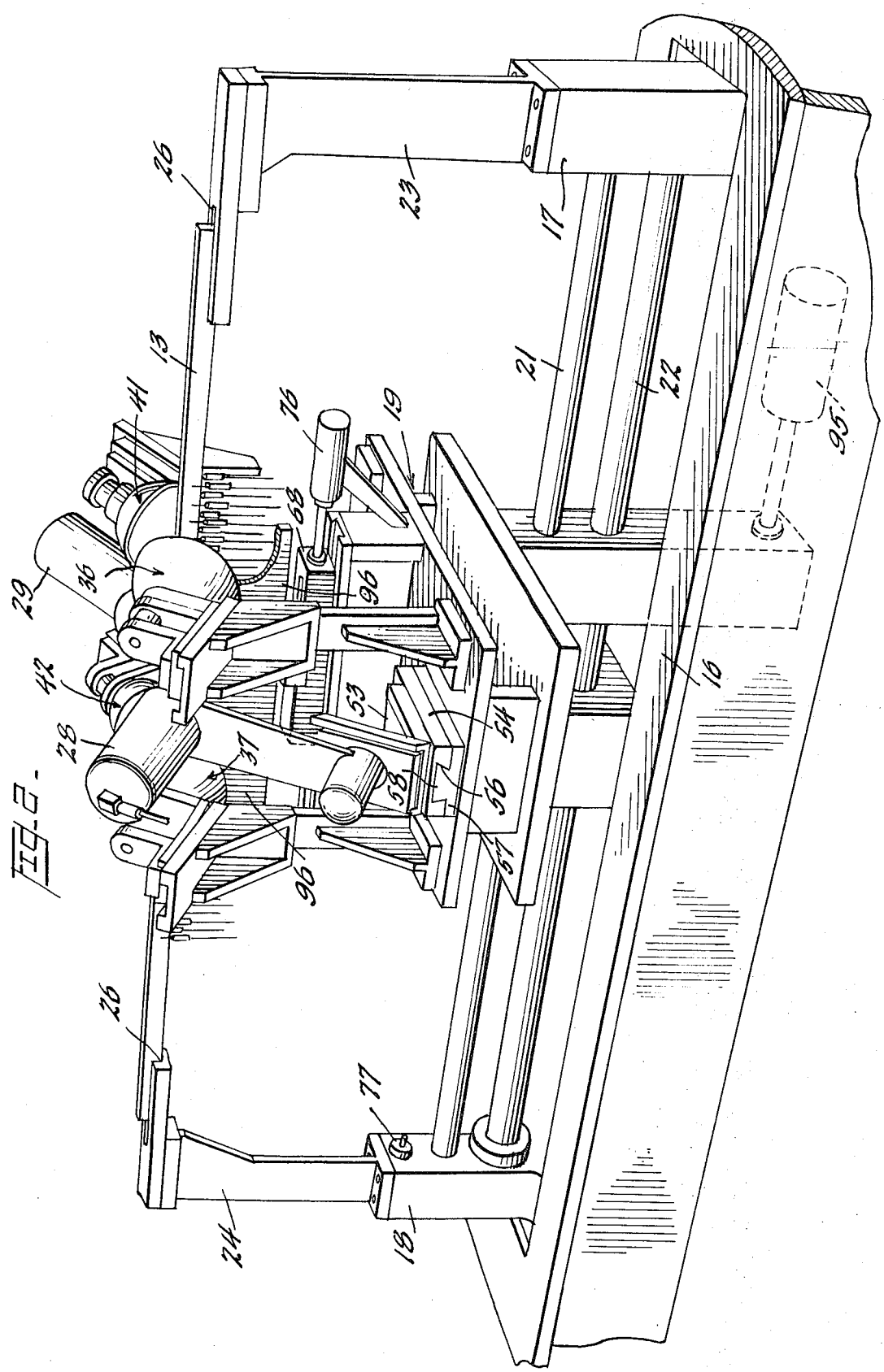

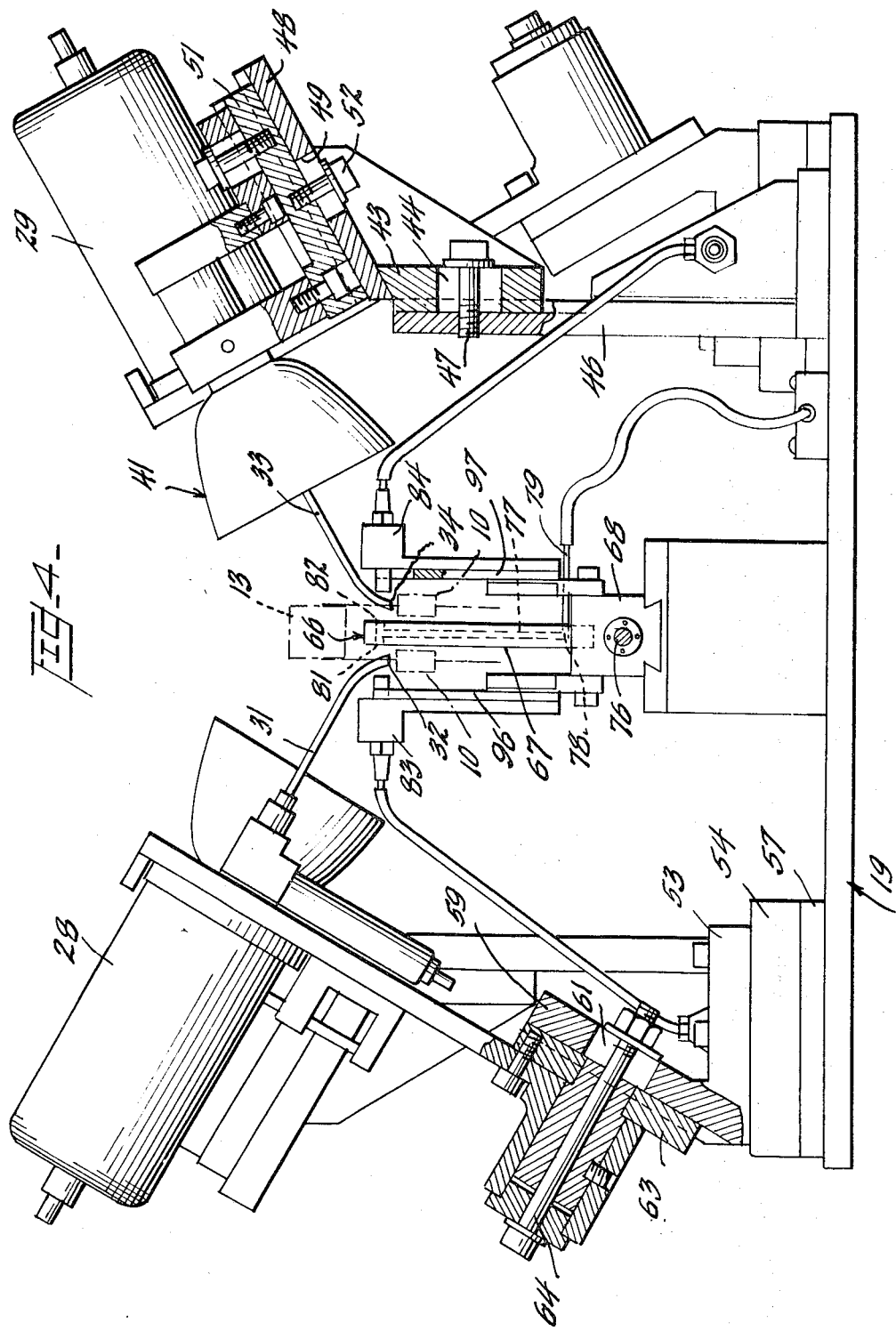

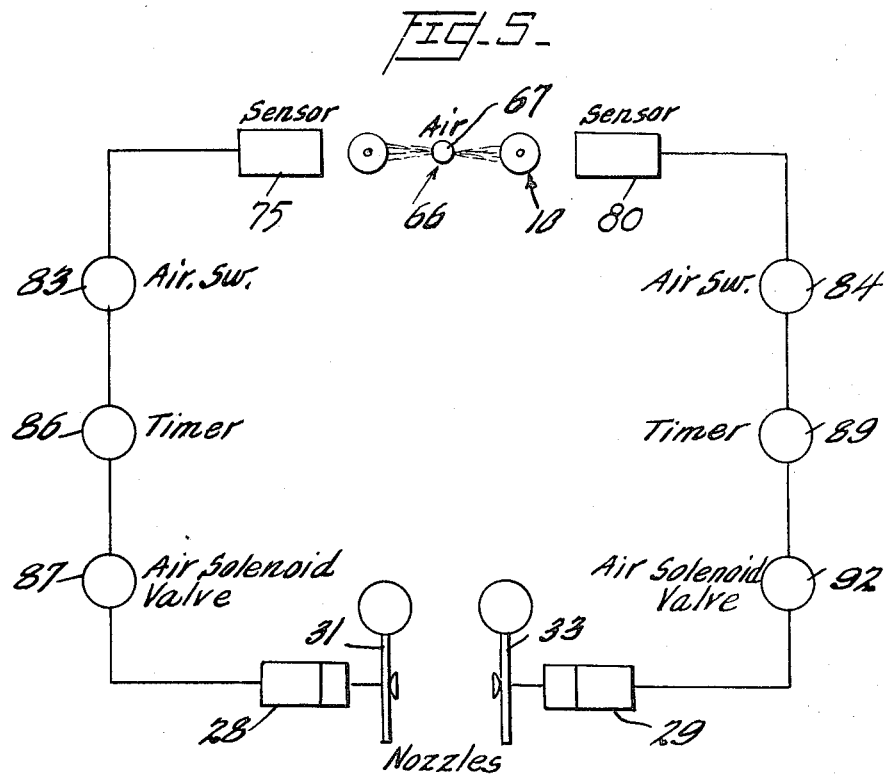
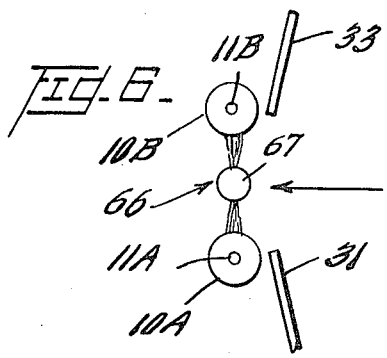
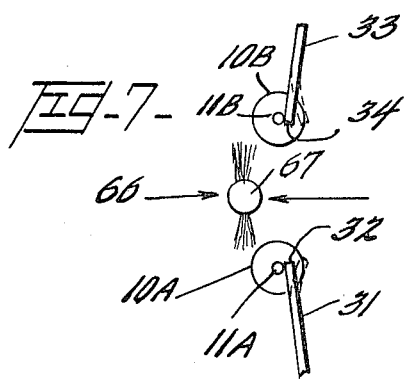

United States Patent Office 3,516,856
Patented June 23, 1970

3,516,856
METHOD OF SEALING THE ENDS OF ELECTRICAL COMPONENTS
Wilhelm Emil Albert Schmidt, Winston-Salem, N.C., assignor to Western Electric Company, Incorporated, New York, N.Y., a corporation of New York
Filed June 15, 1967, Ser. No. 646,360
Int. Cl. B44d 1/18
U.S. Cl. 117—212                                    3 Claims

ABSTRACT OF THE DISCLOSURE

A method of sealing the ends of electrical components which may be adversely affected by the heating thereof. A plurality of components are held in parallel relationship with one end facing upwardly and a bead of sealing material, such as an epoxy, is successively deposited on each end thereof. The beads of sealing material are then heated by a radiant energy source to soften and liquefy the beads so that each bead flows over the entire end surface of the component and about a terminal lead extending from the end. The radiant energy is focused so that it impinges only on the end of the component. Additionally, the body of the component is shielded from the radiant energy source so that it is not deleteriously heated during the softening of the bead of sealing material. Facilities are provided for holding a plurality of components and for successively dispensing a first and a second bead of sealing material on the ends of each component.

BACKGROUND OF THE INVENTION

In the manufacture of solid electrolytic capacitors of the type disclosed in H. E. Haring et al. Pat. 3,093,883, a porous electrode is made by compressing and sintering particles of a film-forming metal, such as tantalum, until the particles are bonded into a rigid porous mass. In the same step, a solid wire lead of the same metal is bonded to the mass with one end embedded within the porous body. Then the porous body is electrolytically anodized to form a dielectric oxide film. The filmed porous body is impregnated with manganese dioxide by dipping it into a solution, such as manganese nitrate, which is pyrolytically convertible to manganese dioxide. The porous body is then re-impregnated with manganese dioxide, after which it is re-anodized to heal any imperfections in the oxide film. The electrode is then impregnated with a conductive material such as graphite, and a metal coating is sprayed or melted over all of the external surface thereof with the exception of the end from which the tantalum lead extends. A bead of sealing material, such as an epoxy, is then applied to the end of the capacitor to provide support for the tantalum wire lead at the juncture with the end of the capacitor. Additionally, the bead of sealing material provides a moisture barrier.

Heretofore, the beads of sealing material have been applied by hand to the ends of a batch of capacitors. Since the sealing material utilized is generally quite viscous, it is necessary to heat the sealing material after it is applied so that it flows around the tantalum wire lead and over the entire end surface of the capacitor. To heat the beads of sealing material, the batch of capacitors were placed in a hot air furnace. The capacitors, however, were adversely affected by the heated environment which caused the porous tantalum body to absorb some of the sealing material through the end surface thereby changing the electrical characteristics of the capacitor.

SUMMARY OF THE INVENTION

A method of sealing an end of an electrical component which is adversely affected by heat includes depositing a bead of sealing material on the end of the component. Radiant energy is then focused and directed at the end of the component to soften the bead of sealing material so that it flows over the entire end surface thereof. Simultaneously therewith, the component body is shielded to prevent radiant energy from impinging thereagainst.

The apparatus for sealing the ends of electrical components includes facilities for holding a plurality of components in parallel relationship, each having one end facing upwardly. Sealing material dispensers and radiant energy sources are mounted to a carriage which is movable relative to the plurality of components in a forward and in a reverse direction. Facilities are provided for detecting the presence of a component and for actuating the dispensers to eject a bead of sealing material onto the end of each component as the carriage moves past. Facilities are also provided for selectively energizing a radiant energy source to heat the beads of sealing material applied to the end of each component. A first bead of sealing material is deposited and heated as the carriage moves in the forward direction. A second bead of sealing material is then applied as the carriage moves in the reverse direction and both the first and second beads of sealing material are heated to flow over the end of the component and form a seal.

BRIEF DESCRIPTION OF THE DRAWINGS

FIG. 1 is a partial side view of a plurality of capacitors each having a terminal welded to a processing bar so that the capacitors are spaced in parallel relationship with one end facing upwardly.

FIG. 2 is a perspective view of the apparatus embodying the principles of this invention.

FIG. 3 is a partial plan view of the apparatus shown in FIG. 2.

FIG. 4 is an enlarged cross-sectional view taken along line 4—4 in FIG. 3.

FIG. 5 is a schematic illustrating the capacitor detecting facilities for actuating the sealing material dispensers.

FIGS. 6 and 7 are enlarged partial plan views showing the capacitor detecting facilities and illustrating how beads of sealing material are wiped off the free ends of the dispenser nozzles onto the ends of the capacitors.

DESCRIPTION OF THE INVENTION

Referring now to FIG. 1, there is shown a plurality of capacitors 10, each having a terminal 11 extending from one end. Each terminal 11 is welded at 12 to an elongated processing bar 13. The processing bar 13 has the capacitors 10 welded thereto during an early stage in the fabrication thereof to facilitate the handling of the capacitors. Capacitors 10 are welded to both sides of the processing bar 13 as shown more clearly in FIG. 4. While this is not necessary, it nevertheless does permit two rows of capacitors to be processed simultaneously. As shown in FIG. 1, a bead of sealing material 14 has already been applied to the upper end of each capacitor 10.

While the method and the apparatus are described hereinafter with respect to sealing the ends of capacitors, it is to be understood that both the method and the apparatus are applicable for use in any situation wherein a sealing material which must be heated for some reason, is to be applied to a portion of any electrical component or to any article which may be adversely affected by heat.

Referring now to FIGS. 2, 3 and 4, there is shown apparatus for sealing the ends of a plurality of capacitors including a frame 16 having a pair of standards 17 and 18 mounted thereto. A carriage, generally designated as 19, is mounted for movement between the standards 17 and 18 on guide rails 21 and 22. Supports 23 and 24 are mounted to the standards 17 and 18, respectively, and have facilities, such as grooves 26 in the upper portion thereof for receiving and holding the ends of a processing bar 13 which has a plurality of capacitors 10 welded thereto. Additional facilities, such as clamps (not shown) may be provided to more securely hold the processing bar 13.

A pair of sealing material dispensers 28 and 29 are mounted to the carriage 19. A flexible nozzle 31 (see FIG. 4) is attached to dispenser 28 and has its free end 32 positioned such that a bead of sealing material 14, ejected from the dispenser 28 through the nozzle 31, is wiped off of the free end 32 of the nozzle 31 by the terminal 11 of the capacitor 10 as the nozzle 31 moves relative thereto. The relatively high viscosity of the sealing material 14 makes it difficult to separate the ejected bead from the nozzle 31 without any wiping action since the bead may tend to adhere to the free end of the nozzle 31 and drop at an improper time. Likewise, a flexible nozzle 33 is attached to the dispenser 29 and has its free end 34 similarly positioned with respect to the other row of capacitors welded to the processing bar 13.

A pair of radiant energy sources 36 and 37 are positioned on either side of the sealing material dispenser 28. Each radiant energy source includes a lamp (not shown), such as an infra-red lamp, mounted within a highly polished semi-eliptical reflector 38 and 39, respectively. Each lamp is positioned at one focus of the semi-eliptical reflector so that radiant energy is focused and concentrated at a second focus which is spaced from the first focus. Each radiant energy source 36 and 37 is adjustable to permit the sources to be moved until the second focus coincides with the upper end of each capacitor 10 as the sources 36 and 37 move relative thereto. Another pair of radiant energy sources 41 and 42 (see FIG. 3) are positioned on either side of the sealing material dispenser 29. These sources are likewise adjustable so that the focused radiant energy is directed at the upper end of each capacitor 10 as the sources 41 and 42 move relative thereto.

The adjustment facilities for radiant energy source 41 are shown in FIG. 4 and include a vertical support member 43 having an elongated slot 44. A threaded fastener 47 connects support member 43 to another support member 46 which extends upwardly from the carriage 19. This provides the vertical adjustment for the radiant energy source 41. Another support member 48 having an elongated slot 49 therethrough, is attached to the vertical support member 43. A base 51 of the radiant energy source 41 is adjustably movable relative to the support member 48 and may be locked in any desired position by another threaded fastener 52. Similar adjustment facilities are provided on the other radiant energy sources 36, 47 and 42.

The adjustment facilities for the sealing material dispenser 28 are shown in FIGS. 2 and 4. In FIG. 2, there is shown a base 53 of the dispenser 28 which is mounted to a slide member 54 having a dovetail groove 56 formed therein. A base member 57 is fixed to the carriage 19 and has a tongue portion 58 thereof which fits within the groove 56. Locking facilities (not shown) lock the base 53 to the carriage 19 when the nozzle 31 of the dispenser 28 is properly positioned so that its free end 32 engages each terminal 11 as the carriage 19 moves. As shown in FIG. 4, a vertical adjustment is provided by a support 59 having an elongated slot 61 therethrough. The support 59 is movable relative to support 63 and can be locked in any position by a threaded fastener 64. Similar adjustment facilities are provided on the other sealing material dispenser 29.

Referring now to FIG. 4, there is shown a sensing unit, generally designated as 66, which is mounted to the carriage 19 and senses the presence of a terminal lead 11 of a capacitor 10 as the carriage 19 moves relative to the processing bar 13 and capacitors 10. As the carriage 19 moves at a constant speed past the plurality of capacitors 10, the sensing unit 66 detects the presence of each capacitor and actuates each sealing material dispenser 28 and 29, so that a bead of sealing material is deposited on the end of each detected capacitor. The sensing unit 66 includes a vertical member 67 which is mounted to a base 68 as shown in FIGS. 3 and 4. The base 68 is movable between a first and a second position relative to the carriage 19. The base 68 has two elongated slots 71 and 72 therein which receive pins 73 and 74 which are fixed to the carriage 19 and limit the movement of the sensing unit 66 with respect to the carriage 19. The base 68 of the sensing unit 66 is movable by an air cylinder 76 which is also mounted to the carriage 19. When the sensing unit 66 is in the first position, it leads the dispenser nozzles 31 and 33 as the carriage travels in the first direction from right to left as viewed in FIG. 2. When the carriage reaches the extreme left-hand position, it engages a switch 77 which is mounted to the standard 18. The closure of the switch 77 reverses the direction of movement of the carriage 19 and also energizes cylinder 76 to pull the base 68 of the sensing unit 66 to its second position at the right so that the sensing unit 66 again leads the nozzles 31 and 33 of the sealing material dispensers 28 and 29 as the carriage 19 travels in the reverse direction, from left to right. Additionally, closure of the switch 77 extinguishes the radiant energy sources 36 and 41 which were lit when the carriage 19 was moving from right to left, and instead turns on the radiant energy sources 37 and 42 to heat the beads of sealing material which are deposited on the ends of the capacitors 10 as the carriage 19 moves from left to right.

The vertical member 67 of the sensing unit 66 has a passageway 77 therethrough. An inlet passageway 78 connects the passageway 77 to an air tube 79 which is in communication with a source of pressurized air (not shown). Air entering the passageway 78 moves up the passageway 77 and exits from the vertical member 67 through horizontal openings 81 and 82 to form two streams of air, each which is directed transversely across one row of terminal leads 11 as the sensing unit 66 moves relative thereto. Air sensors 75 and 80 are positioned opposite the openings 81 and 82, respectively. A passageway (not shown), in each sensor 75 and 80, permits air to flow therethrough. As the carriage 19 moves and air is directed out of the openings 81 and 82, the presence of a terminal lead 11 momentarily interrupts the air stream directed out of, for example, opening 81. This opens a normally closed air switch 83, which is in communication with the sensor 75, to pulse a timer 86, as shown in FIG. 5, which opens an air solenoid valve 87 for a predetermined time. When the valve 87 is opened, sealing material 14 flows under pressure from the dispenser 28 through the flexible nozzle 31 to form a bead of sealing material on the free end 32 of the nozzle 31. The bead of sealing material 14 is wiped off of the free end 32 of the nozzle 31 as the nozzle moves by the detected capacitor. Likewise, when the air stream directed out of opening 82 is interrupted by a terminal lead 11, normally closed air switch 84, which is in communication with the sensor 80, is opened and pulses a timer 89. The timer 89 opens an air solenoid valve 91 for a predetermined time to permit sealing material 14 to flow from the dispenser 29 to form a bead of material on the free end 34 of the flexible nozzle 33. This bead of sealing material is wiped off as the flexible nozzle 33 moves by a terminal lead 11. It is to be noted that the capacitors 10 may be welded to the processing bar 13 in randomly spaced relationship since the sensing unit 66 only actuates the dispensers 28 and 29 when a capacitor lead 11 is detected. Additionally, it is to be noted that the capacitors 10 do not need to be welded in corresponding positions on opposite sides of the processing bar 13 since each air stream directed out of the vertical member 67 of the sensing unit 66, independently actuates its associated dispenser 28 or 29 when a capacitor 10 is detected.

Referring to FIG. 6, there is shown in schematic representation, the sensing unit 66 leading the sealing material nozzles 31 and 33 as the carriage 19 traverses from right to left. The sensing unit is shown in the lead detecting position wherein each stream of air, directed out of openings 81 and 82 in vertical member 67, is interrupted by leads 11a and 11b of capacitors 10a and 10b, causing the dispensers 28 and 29 to be actuated thereby forming a bead of sealing material on the free end of each nozzle 31 and 33. The speed of the carriage 19, and the spacing between the vertical member 67 and the nozzles 31 and 33 are such that immediately upon the formation of the bead of sealing material on the end of each nozzle, the nozzles engage the terminal leads 11a and 11b, as shown in FIG. 7. Since the free end of each nozzle 31 and 33 engages the corresponding terminal lead so that the bead of sealing material, which is quite viscous, can be wiped off it is necessary that the ends of the nozzles 31 and 33 be somewhat flexible so that they can bend, as shown by the dotted lines in FIG. 7, to move past the terminal leads as the carriage 19 continues to move. It is to be noted that the dimensions shown in FIGS. 6 and 7, are greatly exaggerated in order to adequately describe how the sensing unit 66 leads the nozzles, and the cooperation between the nozzles 31 and 33 and the terminals leads 11 as each individual bead of sealing material is wiped off onto the end of a capacitor. In actual practice, the sensing unit 66 leads the nozzles 31 and 33 by only a very small distance.

OPERATION

In operation, a processing bar 13 having a plurality of capacitors 10 welded by the terminal leads 11 to each side thereof is mounted in the grooves 26 of the support members 23 and 24. At this time, the carriage 19 is at the extreme right of the apparatus, as viewed in FIG. 2. When the operator closes a switch (not shown), a hydraulic or an air/hydraulic cylinder 95 is actuated to begin to move the carriage 19 at a constant speed past the length of the processing bar 13. Simultaneously, with the energization of hydraulic cylinder 95, radiant energy sources 36 and 41 are turned on. Additionally, cylinder 76 is energized to move the sensing unit 66 to its leftmost position so that the sensing unit leads the sealing material nozzles 31 and 33 by a predetermined distance. As the vertical member 67 of the sensing unit 66 moves between the first pair of capacitors welded to the processing bar 13, each air stream, directed out of openings 81 and 82, is independently interrupted by a terminal lead 11. Interruption of each air stream causes each associated air switch 83 or 84 to open, thereby pulsing the timers 86 and 89. Each timer 86 and 89 is set to open valve 87 and 92, respectively, for a sufficient period of time so that a predetermined amount of sealing material is dispensed each time the air stream is interrupted by a terminal lead 11. The time cycle of timers 86 and 89 is relatively short, however, so that the capacitors 10 do not have to be spaced any particular distance apart from one another to allow for resetting of the timer. When the valves 87 and 92 are open, sealing material is permitted to flow under pressure from the dispensers 28 and 29 through the nozzles 31 and 33 to form beads of sealing material on the ends 32 and 34 of each respective nozzle.

As the carriage 19 continues past the capacitors 10, the ends 32 and 34 of the nozzles engage the terminal leads 11 and wipe each bead of sealing material onto the end of a capacitor 10. Further movement of the carriage 19 brings the radiant energy sources 36 and 41 into a position wherein radiant energy is focused and directed at the ends of the capacitors to heat and soften the beads of sealing material so that it flows over the end surface of each capacitor 10 and about the terminal lead 11. The radiant energy sources 36, 37, 41 and 42, are all adjusted so that the capacitors 10 are located in a position which corresponds to a focus of the semi-elliptical reflectors of the radiant energy sources. In addition to focusing the radiant energy, heat shields 96 and 97 (FIGS. 2, 3 and 4) are provided to further shield the capacitor body and prevent heating thereof. The heat shields 96 and 97 are mounted to the base 68 of the sensing unit 66 and extend upwardly a distance sufficient to cover all but the upper portion of each capacitor 10.

The carriage 19 continues its leftward movement and successively deposits beads of sealing material on the ends of each capacitor 10 welded to the processing bar 13 and the sealing material is heated as the radiant energy sources 36 and 41 pass by. When the carriage 19 reaches the left standard 18, it engages and closes a switch 77 which reverses the flow of fluid into the hydraulic cylinder 95 causing the carriage 19 to reverse direction and travel at a constant speed from left to right. Simultaneously therewith, air is directed into cylinder 76 to move the base 68 of the sensing unit 66 to its right-hand position so that it again leads the sealing material nozzles 31 and 33 as the carriage travels in the reverse direction. Additionally, closure of the switch 77 extinguishes the radiant energy sources 36 and 41 and energizes the sources 37 and 42. As the carriage 19 moves past the capacitors 10, a second bead of sealing material is deposited on the end surface thereof, as previously described. The first and second beads of sealing material are then heated by the radiant energy sources 37 and 42 to soften and flow over the end surface of the capacitor 10 and about the terminal lead 11. Since the body of the capacitor 10 is shielded by heat shields 96 and 97, and since the radiant energy sources 36, 37, 41 and 42 are focused so that radiant energy impinges only on the upper end of each capacitor 10, the body of the capacitor remains relatively cool. The cool body of the capacitor causes a thin layer of sealing material 14, immediately adjacent thereto, to chill and solidify. This thin layer remains solid during the heating of the rest of the sealing material thereby preventing absorption of the sealing material by the porous body. When the sealing material 14 sets, it provides strength and support to the terminal lead 11 at the juncture with the capacitor and also provides an effective moisture barrier.

After the first and second beads of sealing material are deposited on the ends of each capacitor, the carriage 19 returns to its right-hand position and closes a switch (not shown) which stops the carriage. An operator then removes the processing bar 13 and the attached sealed capacitors 10 from the holding facilities. Another processing bar 13, having capacitors 10 welded thereto which are ready for the application of sealing material to one end thereof, is inserted in the holding facilities and another cycle of operation is begun.

It is to be understood that the above-described embodiment is merely illustrative of an application of the principles of this invention and that numerous other arrangements and modifications may be made within the spirit and scope of the invention.

What is claimed is:
1. A method of applying a relatively viscous sealing material with a nozzle member to an end of an electrical component having a terminal lead extending from the end thereof comprising:
   holding said component with said end and said terminal lead facing upwardly;
   forming a bed of sealing material on an end of said nozzle member;
   moving said nozzle member relative to said component to wipe said bead of sealing material off said end of said nozzle member onto said terminal lead near the juncture of said lead and said end of said component; and
   directing radiant energy at said end of said component to heat said bead of sealing material to soften said bead so that it flows over the end of said component and about said terminal lead.
2. A method of applying a relatively viscous sealing material with a flexible nozzle to the ends of a plurality of electrical components, each of which has a terminal lead extending from the end thereof, comprising:

holding a plurality of components in spaced parallel relationship, each having said end and said terminal lead facing upwardly;

forming a bead of sealing material on a free end of said flexible nozzle member prior to engagement of the free end thereof with each of said terminal leads;

moving said flexible nozzle member relative to said plurality of components so that the free end thereof successively engages each terminal lead and bends as it moves past to wipe the bead of sealing material off said free end of said nozzle member onto said terminal lead; and momentarily heating each bead of sealing material so that it flows over the entire end of said component and about said terminal lead.

3. A method of applying a relatively viscous sealing material with a flexible nozzle member to the ends of a plurality of electrical components, each of which has a terminal lead extending from the end thereof, comprising:

holding a plurality of components in spaced parallel relationship, each having said end and said terminal lead facing upwardly;

moving said flexible nozzle member at a constant speed relative to said plurality of components so that the free end of said nozzle member follows a path which successively brings it into engagement with each terminal lead of said components near the juncture of said terminal lead and said end of said component;

forming a bead of sealing material on said free end of said nozzle member prior to engagement of the free end thereof with each of said terminal leads;

urging the flexible nozzle member past each terminal lead so that the free end thereof bends as it engages and passes each terminal lead to wipe the bead of sealing material off said free end onto said terminal lead; and directing and focusing radiant energy onto each bead of sealing material to soften each bead so that it flows over the entire end of the component and about the terminal lead.

References Cited

UNITED STATES PATENTS

| | | | |
|---|---|---|---|
| 3,413,711 | 12/1968 | Brewer et al. | 29—503 X |
| 3,359,938 | 12/1967 | Klemmer | 118—411 X |
| 3,323,492 | 6/1967 | Mellar et al. | 118—401 X |
| 3,227,136 | 1/1966 | Bartlett et al. | 118—410 |
| 3,225,438 | 12/1965 | Cooper | 29—492 |
| 3,222,234 | 12/1965 | De Jean et al. | 264—262 |
| 3,005,539 | 10/1961 | Wellington. | |

FOREIGN PATENTS 648,531   9/1962   Canada.

ALFRED L. LEAVITT, Primary Examiner

A. GRIMALDI, Assistant Examiner

U.S. Cl. X.R.

29—628; 118—401